United States Patent [19]

Kessel et al.

[11] Patent Number: 5,061,568

[45] Date of Patent: Oct. 29, 1991

[54] SOLAR SCREENING ASSEMBLY

[75] Inventors: Stephen L. Kessel, Loveland, Ohio; George E. Mont, Wilbraham, Mass.

[73] Assignee: Monsanto Company, St. Louis, Mo.

[21] Appl. No.: 453,556

[22] Filed: Dec. 20, 1989

[51] Int. Cl.$^5$ ............................................. B32B 17/10
[52] U.S. Cl. ..................................... 428/437; 428/426; 428/432; 428/433; 428/469; 428/480; 428/699; 428/701; 428/702; 428/913; 359/589; 359/360
[58] Field of Search ............... 428/437, 426, 432, 433, 428/480, 701, 702, 688, 699, 913, 457, 469; 219/203; 350/1.6, 1.7, 164

[56] References Cited

U.S. PATENT DOCUMENTS

| 4,368,945 | 1/1983 | Fujimori et al. ..................... 350/1.7 |
| 4,465,736 | 8/1984 | Nishihara et al. ................... 428/332 |
| 4,782,216 | 11/1988 | Woodard ............................ 219/547 |
| 4,799,745 | 1/1989 | Meyer et al. ....................... 350/1.7 |
| 4,943,140 | 7/1990 | Woodard et al. .................... 219/203 |
| 4,943,484 | 7/1990 | Goodman ........................... 428/426 |

FOREIGN PATENT DOCUMENTS 0263623 4/1988 European Pat. Off. .
WO8801230 2/1988 PCT Int'l Appl. .

*Primary Examiner*—Merrell C. Cashion, Jr.
*Assistant Examiner*—D. S. Nakarani
*Attorney, Agent, or Firm*—Michael J. Murphy; William J. Farrington

[57] ABSTRACT

In a solar screening assembly optionally heatable for defrosting/defogging/deicing which includes a plasticized polyvinyl butyral layer and a metal/dielectric stack comprising one or more light-reflecting metal layers and two or more antireflective layers, a cap layer $Ta_2O_5$ or $SiO_x$ where $x \leq 2$, in face-adhering contact with the plasticized polyvinyl butyral layer, such assembly when laminated with glass exhibiting pummel adhesion of at least 3 after at least 1000 hours exposure to UV radiation in a Fadeometer, Weatherometer or equivalent system.

15 Claims, No Drawings

SOLAR SCREENING ASSEMBLY

BACKGROUND OF THE INVENTION

This invention relates to a solar screening and/or electrically heatable layered assembly employing a metal/dielectric stack and more particularly to such an assembly which includes an energy-absorbing plastic interlayer.

Metal/dielectric stacks in window applications to reflect infrared radiation while transmitting significant visible light are well known. The effect is to reduce temperature buildup from solar radiation within an area delimited by one or more of such windows. These stacks are called interference filters and comprise at least one layer of reflective metal sandwiched between reflection-suppressing or antireflective dielectric layers. Likewise known is heating the metal layer by electrical conductance to provide defrost or deice and/or defog capability. Representative structures for motor vehicle windshields are disclosed in International Publication No. WO88/01230 and U.S. Pat. No. 4,799,745.

When such interference filters are combined with glass in laminated glazing assemblies, particularly in vehicle windshields, it is desirable to include a shock-dissipating interlayer of plasticized polyvinyl butyral (PVB) in the assembly to absorb a blow, e.g. from the head of an occupant within the vehicle, without penetrating the windshield. Various antireflective dielectric layers as components of the interference filter or metal/dielectric stack have been interchangably proposed for contact with such a PVB layer as, for example, recited in U.S. Pat. No. 4,786,783. Unfortunately, the integrity of multilayered laminated glazings which include such interference filters and PVB layers have been less then desirable after extended periods of use.

SUMMARY OF THE INVENTION

Now, improvements have been made in solar or heatable screening assemblies which mitigate shortcomings of the prior art.

Accordingly, a principal object of this invention is to improve the performance of solar screening and/or electrically heatable assemblies in window (including windshield) applications which include a plasticized PVB layer.

Another object is to improve the long term adhesion stability between a metal/dielectric stack and a plasticized PVB layer during exposure to sunlight.

A specific object is to improve the service life of solar screening assemblies employing a plasticized PVB layer which undergo prolong exposure to UV radiation.

Other objects of this invention will in part be obvious and will in part appear from the following description and claims.

These and other objects are achieved in the present invention by recognizing that certain specific dielectric layers, i.e. oxide(s) of silicon or tantalum oxide, in contact with the plasticized PVB layer of a solar screening assembly promote the long term stability of the bond between the plasticized PVB layer and the solar screening assembly.

More specifically, there is provided in a solar screening assembly which includes a plasticized polyvinyl butyral layer and a metal/dielectric stack comprising one or more light-reflecting metal layers and two or more antireflective layers, a cap layer of $Ta_2O_5$ or SiOx where $x \leq 2$, in face-adhering contact with the plasticized polyvinyl butyral layer, such assembly when laminated with glass exhibiting pummel adhesion of at least 3 after at least 1000 hours exposure to UV radiation in a Fadeometer, Weatherometer or equivalent system.

DETAILED DESCRIPTION OF THE INVENTION

This invention recognizes that i) prolonged exposure to significant UV radiation from the solar spectrum of conventional plasticized PVB bonded to a metal/dielectric stack of a solar screening assembly causes premature deterioration of the bond between such two components and ii) deterioration of such bond is unexpectedly arrested by using a cap layer of $Ta_2O_5$ or SiOx where x is $\leq 2$ in contact on one side with the plasticized PVB layer and on the other side with an anti-reflective layer of the metal/dielectric stack. If the desired visible light transmission and infrared reflecting levels can be achieved, the layer of $Ta_2O_5$ can simultaneously function as the bond-stabilizing cap layer and the anti-reflective layer of the metal/dielectric stack. With the silicon embodiment, a separate antireflective layer is required since the refractive index of the silicon compound in the stack is inadequate to provide the desired optical properties (visible transmission and reflection and solar rejection). When using the silicon embodiment, the value of x can vary depending on the amount of oxidation obtained during deposition of this cap layer. This is determined by the sputtering conditions used, e.g. deposition rate, the power level used, the presence of 100% oxygen in the sputtering chamber or of an admixture of oxygen and another gas such as argon. The value of x or the oxidation state for any given set of deposition conditions can be determined by known ESCA (XPS) or AES analysis.

Stability of the bond between the plasticized PVB layer and the anti-reflective layer of the metal/dielectric stack to long term exposure to sunlight is measured by accelerated testing exposure of the solar screening assembly to a source of intense UV radiation in the form of a Fadeometer (carbon arc source), Weatherometer (xenon arc source) or equivalent system (including a QUV system) in which a large percentage of the light emitted is composed of UV radiation. Resistance of the bond to deterioration as determined by the Pummel Adhesion Test further described hereafter, is considered adequate if an assembly survives at least 1000 hours in such an accelerated exposure system. This is about equal to one year of intense sunlight exposure as might be encountered in Arizona, which in turn is representative of a longer period of exposure to less severe conditions. The plasticized polyvinyl butyral layer of the solar control assembly is well known and commercially available form Monsanto Company as Saflex ® sheet.

The metal dielectric stack component of the solar screening assembly is an interference filter of the Fabry-Perot type designed, principally through the appropriate selection of materials and their thicknesses to maximize (i) transmission of visible or luminous and (ii) reflection of heat-generating infrared portions (700–2125 nm) of the solar spectrum. Such stacks consist of multiple, sequentially deposited planar layers of angstroms-thick metal and dielectric coatings arranged in a predetermined sequence in face-adhering, contiguous contact with each other, as generally disclosed in U.S. Pat. Nos. 3,682,528 and 4,179,181.

The preferred dielectric stack contains at least two near IR reflecting metal layers which in operative position transmit at least 70% visible light of normal incidence measured as specified in ANSI Z26.1, this being the minimum required in the U.S. automotive industry. Somewhat less than this level is acceptable in less demanding architectural applications where a single metal layer or other more light absorbing metal/dielectric stacks may be used. Preferably visible light reflectance, normal from the surface of the stack is less than about 8%. The metal layer(s) must be separated (i.e. vertically in the thickness direction) from each other by one or more dielectric layers so reflection of visible light from the metal layer(s) interferes destructively thereby enhancing visible transmission. Usable metals comprise silver, aluminum, chromium, zinc, tin, nickel, brass, gold, stainless steel, copper, and alloys or claddings of any of the foregoing. The preferred metal is silver. Metal layer thickness should be between 60 to 200, preferably 80 to 140 A.

The dielectric layer element must be essentially transparent over the visible range and at least one must exist between a pair of metal layers. Preferably a dielectric layer is on each side of a metal layer. Exemplary usable dielectric materials include $WO_3$, $In_2O_3$, $SnO_2$, ITO, $Al_2O_3$, $MgF_2$, ZnS, $TiO_2$ and ZnO.

The substrate of the solar screening assembly comprises one or plural layers, one of which directly supports the metal/dielectric stack in that a layer of the latter rests in face-to-face contact on the substrate surface. The substrate can be any of a variety of materials. Usable substrates should not be prone to stretch to avoid cracking the metal/dielectric layers and should be free of excess volatiles such as plasticizers, water vapor or absorbed gases. The dielectric layer of the stack in direct contact with the substrate should adhere well to the substrate surface. Generally such dielectrics adhere well to glass, ceramics and certain flexible plastics such as polyesters, cast acrylics, polycarbonates, chlorinated plastics and epoxies. Uncrosslinked polyurethanes and plasticized polyvinyl butyral as a substrate component in direct supportive contact with the metal/dielectric stack are too soft and extensible. Preferred substrates are sheet(s) of transparent materials such as glass or non-extensible flexible plastic materials such as linear polyesters, e.g. polyethylene terephthelate (PET) (or equivalent material having the characteristics of PET) which is commercially available as Mylar ® or Hostaphan from Hoechst Celanese Corp. In a preferred construction, the layers of the metal/dielectric stack are sequentially magnetron sputtered on glass or a flexible sheet substrate of PET and then the substrate carrying the metal/dielectric stack is encapsulated within two layers of conventional plasticized polyvinyl butyral, one layer of which abuts the PET substrate and the other of which abuts the top layer of the stack. The multilayered sandwich containing PVB as the outer layers is then conventionally laminated between two rigid members such as glass panes, or alternatively may be used as a bilayer structure by laminating it to one such rigid member intended to be the exterior side of a window.

As generally known in the art, varying the thickness and composition of a dielectric layer spaced between the preferred two reflecting metal layer construction, will vary the optical transmittance/ reflection properties considerably. More specifically, varying the thickness of the spacing dielectric layer varies the wave length associated with the reflection suppression (or transmission enhancement) band. In addition to choice of metal, thickness also determines its reflectivity, the thinner the layer, the less its reflectivity. Generally, the thickness of spacing dielectric layer(s) should be between about 200 to about 1200 and preferably between 450 to 1000 A to obtain the desired optical properties for a commercially acceptable product. Metal oxide dielectric layers less than about 200 or more than about 1200 A result in poor solar control properties.

Exterior dielectric layers in contact with the metal layer surfaces opposite to the metal surfaces contacting spacing dielectric layer(s) enhance anti-reflection performance. Exterior dielectric layers generally should have a higher refractive index than glass or polyvinyl butyral, i.e. greater than 1.5 and preferably greater than 1.8. The thickness of such exterior or outside dielectric layer(s) is generally less than the spacing dielectric layer(s) and should be about 20 to about 600 and preferably 50 to 500 A.

The solar screening assembly of the invention can be used in any optically transparent window application. Typical applications include aircraft, locomotive and automotive windshields and architectural applications such as commercial and residential buildings. By conductively associating the metal layer(s) with a source of electrical power through the use of conventional bus bars, defrosting or defogging or deicing capability can be readily provided in the assembly.

The Pummel Adhesion Test was used to measure adhesion of the PVB layer to the dielectric layer of the metal/dielectric stack with which it is in contact. In such test, glass laminates containing the metal/ dielectric stack and adhering plasticized PVB layer are conditioned to 0° F. ($-17°$ C.), pummeled with a 1 pound (454g) hammer to break the glass and all broken glass unadhered to the PVB layer then removed. The amount of glass left adhered to the interlayer is visually compared to a set of standards of known pummel scale, the higher the number of the standard, the more glass remaining adhered to the interlayer—i.e. at a pummel of zero, no glass at all is left whereas at a pummel of 10, 100% of the interlayer surface is adhered to glass. Good impact dissipation is correlatable with a pummel adhesion value of 3 to 7, preferably 4 to 6. At less than 3, too much glass is lost on impact whereas at more than 7 adhesion is too high and impact strength is poor.

The invention is further described with reference to the following examples which are for illustration only and are not intended to imply any limitation or restriction on the invention.

CONTROL EXAMPLES

C1—Samples were prepared of standard float glass (3 in. by 4 in. by ⅛ in. thick) sputter coated with three successive layers of zinc oxide and silver in conventional manner to provide a solar screening assembly comprising metal/dielectric stack of the following structure and thicknesses: Glass/ ZnO(400 A)(layer 1)/Ag(150 A) (layer 2)/ZnO(400A) (layer 3). Thirty mil thick plasticized polyvinyl butyral sheet available from Monsanto as Saflex ® TG sheet was laminated to the exposed ZnO layer (with an additional layer of float glass on the side of the Saflex TG sheet not in contact with the ZnO layer) using standard laminating conditions of 290° F., 185 psi. An additional layer of float glass was then laminated to the exposed surface of the PVB layer. The resulting structure is representative of what would be used in a vehicle windshield. Optical properties of the assembly after lamination to the glass were:

| % TV | % Rv | % Av | % Ts | % Rs | % As | % SR |
|---|---|---|---|---|---|---|
| 72.2 | 16.6 | 10.4 | 49.2 | 30.7 | 20.2 | 45.4 |

The samples were placed in a carbon arc Fadeometer with the PVB layer in one case facing away from and in another case facing toward the carbon arc and pummel adhesion was measured with time. For samples having the PVB layer facing away from the carbon arc, (i.e. metal/dielectric stack facing the arc) pummel adhesion had dropped from 3-4 before exposure to zero overnight. For samples with the PVB layer facing the UV radiation, pummel adhesion was zero after 3,4 days. Replacement of the zinc oxide layers with tin oxide in another set of samples gave equivalent poor results.

C2 —An assembly of the same sputtered metal/dielectric components and thicknesses as in Example C1 was capped by sputter deposition of about 50A of TiOx, where x was believed about equal to 2, on the exposed surface of ZnO layer 3 before laminating to the PVB layer. Glass laminated samples of this structure prepared as in C1 were tested in a xenon arc Weatherometer with the metal/dielectric stack uppermost and facing the xenon arc. Pummel adhesion was measured with time and results were as follows:

| | Pummel Adhesion | | | | |
|---|---|---|---|---|---|
| Cap Layer | 0 hrs | 20 hrs | 100 hrs | 500 hrs | 1000 hrs |
| TiO$_2$ on ZnO/Ag/ZnO | 6 | 3 | 2 | 0 | 0 |

Control Examples C1 and C2 show rapid deterioration of the bond at the interface between the PVB layer and an immediately subjacent metal oxide (TiO$_2$, SnO$_2$ or ZnO) layer of a metal/dielectric stack. Failure has occurred at this dielectric - PVB layer interface as opposed to the PVB-glass interface since conventional PVB alone between glass layers will survive indefinitely under these exposure conditions.

EXAMPLES 3 AND 4

These Examples are according to the invention.

ZnO(450)/Ag(150)/ZnO(450) metal/dielectric stacks on glass as in Example C1 were separately capped with Ta$_2$O$_5$ and SiOx where x was believed equal to 2, by magnetron sputter deposition onto the exposed surface of ZnO layer 3 using a Leybold Heraeus sputter coater. Layer thicknesses determined using an Inficon XTC crystal monitor were ZnO(450A)/Ag(100A)/ZnO(400A)/ Ta$_2$O$_5$ or SiOx(50A). Laminates were prepared as in Example C1 with the exposed surface of the cap layer in face-adhering contact with 30 mil thick Saflex TG sheet. The sequential layers of a laminate were glass substrate/metal-dielectric stack/cap/PVB/glass.

Optical properties after glass lamination were measured using a Perkin Elmer 330 UV/VIS/NIR spectrophotometer with results as follows:

| Example | Cap Layer | % Tv | % Rv | % Av | % Ts | % Rs | % As | % SR |
|---|---|---|---|---|---|---|---|---|
| 3 | Ta$_2$O$_5$ | 70.8 | 17.1 | 11.4 | 47.5 | 30.1 | 22.4 | 46.5 |

The samples were placed in a carbon arc Fadeometer with the metal-dielectric stack uppermost and facing the arc light source. Pummel adhesion (average of two laminates per pummel test) measurement results with time were as follows:

| Example | Cap Layer | 0 hrs | 20 hrs | 100 hrs | 500 hrs | 1000 hrs |
|---|---|---|---|---|---|---|
| 3 | Ta$_2$O$_5$ | 9 | 9 | 8 | 7 | 7 |
| 4 | SiO$_2$ | 8 | 8 | 8 | 7 | 7 |

The above data dramatically shows preservation of the bond at the interface between the PVB layer and a Ta$_2$O$_5$ or SiOx cap layer after extended 1000 hrs. exposure to intense UV radiation in a Fadeometer, as evidenced by the pummel adhesion values of 7 for each of the samples using Ta$_2$O$_5$ and SiO$_2$ cap layers.

Another ZnO/Ag/ZnO metal stack on float glass was capped with a 100A thick sputter deposited layer using a different coating machine on a different occasion from that of Example 4. Pummel adhesion of laminates containing such a stack held constant at 9 from initial exposure at 0 hrs. through 1000 hrs. Though this value is above the desired range of 3-7 and therefore impact absorption would be expected to be too high, the pummel value can be easily reduced into the desired range by incorporating, in a well known manner, a suitable adhesion control agent into the formulation from which the PVB sheet is made. This is to be contrasted with a pummel of <3 as in the control Examples which cannot be brought back up into the desired 3-7 range.

The preceding description is for illustration only and is not to be taken in a limited sense. Various modifications and alterations will be readily suggested to persons skilled in the art. It is intended therefore that the foregoing be considered as exemplary only and that the scope of the invention be ascertained from the scope of the following claims.

We claim:

1. In a solar screening assembly which includes a plasticized polyvinyl butyral layer and a metal/dielectric stack comprising one or more lightreflecting metal layers and two or more anti-reflective layers, a cap layer of Ta$_2$O$_5$ or SiOx where x≦2 in face-adhering contact with the plasticized polyvinyl butyral layer, said assembly when laminated with glass exhibiting pummel adhesion of at least 3 after at least 1000 hours exposure to UV radiation in a Fadeometer or Weatherometer.

2. The assembly of claim 1 wherein the cap layer is SiOx where x≦2.

3. The assembly of claim 1 wherein the cap layer is Ta$_2$O$_5$.

4. The assembly of claim 1, 2 or 3 wherein pummel adhesion is between 4 and 6.

5. The assembly of claim 4 wherein the cap layer is the top layer of the metal/dielectric stack.

6. A solar screening assembly comprising:
   a) a transparent substrate;
   b) a plasticized polyvinyl butyral layer; and c) a metal/dielectric stack between the substrate and the plasticized polyvinyl butyral layer which includes one or more light-reflecting metal layers, each surface of which is contiguous with an anti-reflecting metal oxide layer and a cap layer of $Ta_2O_5$ or $SiO_x$ where $x \leq 2$ in face-adhering contact with the plasticized polyvinyl butyral layer;

said assembly in a laminate with glass exhibiting pummel adhesion of at least 3 after 1000 hours exposure to intense UV radiation in a Fadeometer or Weatherometer.

7. The assembly of claim 6 wherein the substrate is a glass layer.

8. The assembly of claim 6 wherein the substrate comprises a layer of oriented polyester in contact on one side with the metal stack and on the other side with another layer of plasticized polyvinyl butyral.

9. The assembly of claim 6, 7 or 8 wherein the cap layer comprises $Ta_2O_5$.

10. The assembly of claim 6, 7 or 8 wherein the cap layer comprises $SiO_2$.

11. The assembly of claim 9 wherein pummel adhesion is between 3 and 7.

12. The assembly of claim 10 wherein pummel adhesion is between 3 and 7.

13. A solar screening assembly comprising:
   a) a transparent substrate of glass or molecularly oriented polyethylene terephthalate,
   b) a metal/dielectric stack on the substrate comprising:
      i) a first layer of zinc oxide on the substrate;
      ii) a second layer of silver on the first zinc oxide layer;
      iii) a third layer of zinc oxide on the second silver layer;
      iv) fourth layer of tantalum oxide or $SiO_x$ where $x \leq 2$ on the third layer of zinc oxide; and
   c) a plasticized polyvinyl butyral layer in face-adhering contact with the fourth layer of the metal/dielectric stack;

said assembly in a laminate with glass exhibiting pummel adhesion of at least 3 after 1000 hours exposure to intense UV radiation in a Fadeometer or Weatherometer.

14. The assembly of claim 13 wherein the fourth layer is $Ta_2O_5$.

15. The assembly of claim 13 wherein the fourth layer is $SiO_x$ where $x \leq 2$.

* * * * *